United States Patent Office
3,647,658
Patented Mar. 7, 1972

3,647,658
METHOD OF MAKING LACQUER COATINGS BY MEANS OF ELECTRO-PHORETIC DEPOSITION
Erich Hofling and Hanspeter Breu, Kreuzlingen, Switzerland, assignors to Swiss Aluminum, Ltd., Chipps, Switzerland
No Drawing. Filed Sept. 17, 1970, Ser. No. 73,186
Claims priority, application Switzerland, Sept. 18, 1969, 14,449/69
Int. Cl. B01k *5/02;* C23b *13/00*
U.S. Cl. 204—181    6 Claims

ABSTRACT OF THE DISCLOSURE

Method of covering a metal object with electro-phoretically deposited coatings having high dielectric strength wherein the previously electro-phoretically coated object after its burning-in the lacquer coating is exposed to a voltage stress in a liquid capable of conducting electrical current, the voltage is increased until the breakdown of the weak points of the coating takes place, and subsequently the object is electrophoretically lacquered again to cover the points of breakdown with a new lacquer layer without substantially changing the thickness of the previous coating.

FIELD OF THE INVENTION

The present invention relates to a method for making lacquer coatings having high dielectric strength by means of electro-phoretic deposition on metal objects, preferably on metal strips. The invention also relates to the application of the above-mentioned method to the making of insulated metal strips for use in electric spools.

BACKGROUND OF THE INVENTION

In the process of electro-phoretic lacquering a coating is deposited from an appropriate lacquer system under the influence of an applied voltage, such coating undergoing a subsequent burning-in process. Such lacquer making possesses several advantages with respect to the conventional dipping, praying and rolling application of lacquers which employ a lacquer system containing a solution. The coating obtained in the previously mentioned method exhibits a relatively good pore-free property and a good covering of edges, corners and projections of the coated objects. Such properties make the electro-phoretic lacquering method adaptable for producing insulations on objects which are used for electro-technical purposes, such as, for making lacquer coatings on thin metal strips for use in induction spools. The conventional lacquering methods result in very thin and practically useless coatings for insulation purposes on corners and edges of the coated objects due to the surface tension on such portions of the objects.

Also electro-phoretic lacquers do not possess a sufficiently high dielectric strength which is necessary for the electro-technical applications. This is due to the fact that even electro-phoretic coatings despite the fact that they have been deposited nearly pore-free, show a slight porosity which affects the otherwise good dielectric strength of the lacquer layer due to the fact that in the process of the burning-in stage a loss of water, formaldehyde etc. occurs. Also thin metal strips on their edges, in some cases, have burr-like formations as a result of the imperfections of the cutting process or a certain roughness, both of which show up as weak points in the subsequent lacquer coating. A different kind of defect may appear due to the fact that on certain spots the metal strips are insufficiently wettable or the used lacquer itself has insufficient wetting properties, and as a result, microscopic spots will form in the lacquer film which, when compared with the general thickness of the lacquer layer on other portions of the coated object, have a very thin lacquer layer and, thereby, has a reduced dielectric strength, that is, a diminishing insulating property.

SUMMARY OF THE INVENTION

It is, therefore, an object of the present invention to provide an improved method of making lacquer coatings through electro-phoretic deposition resulting in a coating having high dielectric strength and high insulating properties adapting the coated objects for use in demanding electro-technical applications.

According to the invention an object undergoes in the first stage an electro-phoretic lacquering and a subsequent burning-in stage of the coating, then such object is exposed to a voltage stress in a liquid capable of conducting electrical current, such voltage stress resulting in the breakdown of the coating on weak points thereof, whereupon the object is put through another electro-phoretic lacquering.

The method according to the present invention enables one to discover the weak points in the coating which are especially susceptible to dielectrical breakdown. Such weak points become broken down due to the applied voltage and, as a result, they become free from the lacquer coating. In the subsequent electro-phoretic lacquer coating such spots become lacquered again. The electrical stressing and the subsequent electro-phoretic lacquering can be made with an increased voltage and repeated again after the subsequent burning-in of the previously deposited coating. As a result, the number of the remaining defective points, that is weak insulation points becomes substantially reduced and, consequently, the dielectric strength of the coating of the entire device can be substantially increased.

The electrical stressing can be made in the same working process and in the same bath with the subsequent electro-phoretic lacquering.

Preferably a separate electrically conducting bath is used which is then followed by an electro-phoresis in which a higher depositing voltage is applied.

The invention will become more readily apparent from the following description of preferred embodiments thereof.

DESCRIPTION OF PREFERRED EMBODIMENTS

Example 1

A strip of pure aluminum having a 30 mm. width and a 0.1 mm. thickness has undergone electro-phoretic lacquering in a known process using an electro-phoresis bath with a commercial alkydmelamine resin system. The strip was continuously passed through the lacquer bath and the deposition of the lacquer has been affected by the application of about 80 volts. The entire deposition process lasted about 20 seconds. After blowing-off the excess liquid by pressurized air and after burning-in the lacquer, a layer having a thickness of about 10–12/1,000 mm. was obtained. In order to perform the dielectric strength test a section of the above lacquered strip having a length of about 100 mm. was immersed in mercury and the strip and the mercury were connected to a voltage source the output of which has been increased until a dielectric breakdown has been obtained. In several tests voltages of 1.5–5.0 volts have been attained.

Example 2

An aluminum foil strip which has undergone the lacquering process as described in Example 1, has been, in a second work process according to the present invention, pulled through the same lacquer bath, however, the depositing voltage has been increased to 280 volts. After burning-in the coating the lacquer layer has been measured again and there was no measurable increase in the thickness observed. The measuring of the dielectric strength resulted, however, in values of 30–80 volts.

If the electro-phoretic deposition at a voltage of 280 volts had been used already in the first stage, a useless coating would have been obtained. Such voltage would be too high for the presently known resin systems and would result in blisters and porous lacquers.

Example 3

A foil strip which has been provided with a lacquer layer in Example 1 was according to a variation of the method of the present invention continuously pulled through a solution of 10% NaCl in water and in such a bath a voltage of 100 volts was applied to the strip and to a counter electrode.

The retention of the strip in this bath amounted to 10 seconds. Subsequently the strip at a deposition voltage of 280 volts has undergone a renewed electro-phoretic lacquering. Also in this case there was no noticeable increase in the thickness of the layer. The dielectric strength increased, however, to about 50–100 volts. Instead of the saline solution other watery saline solutions can be used.

The method according to the present invention can be practiced with other kinds of resin systems while the concentration, the depositing voltage, the thickness of the layer, and the dielectric strength can be varied and adjusted according to the properties of the lacquer binding agent used to arrive at optimum results.

From the above, it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

What is claimed is:

1. Method of covering a metal object with electro-phoretically deposited coatings having high dielectric strength comprising the steps of exposing a previously electro-phoretically coated object after its burning-in the lacquer coating to a voltage stress in a liquid capable of conducting electrical current, such voltage step resulting in the breakdown of the weak points of the coating, and subsequently electro-phoretically lacquering the object.

2. The method as claimed in claim 1, wherein said object is a metal strip for use as insulation in an electrical spool.

3. The method as claimed in claim 1, wherein the voltage stressing step is performed in a separate electrically conducting bath.

4. The method as claimed in claim 1, wherein the voltage stressing step is performed in the same working step with the subsequently following electro-phoretic lacquering.

5. The method as claimed in claim 1, wherein the voltage stressing step of the coating is performed in a sodium chloride solution.

6. The method as claimed in claim 1, wherein said subsequent phoretic lacquering of object is performed at a voltage which is higher than the voltage in the previous step.

References Cited

UNITED STATES PATENTS 3,463,714    8/1969    Suomi et al. _____ 204—181

HOWARD S. WILLIAMS, Primary Examiner

UNITED STATES PATENT OFFICE
CERTIFICATE OF CORRECTION

Patent No. 3,647,658                    Dated March 7, 1972

Inventor(s) Erich Hofling, et al

It is certified that error appears in the above-identified patent and that said Letters Patent are hereby corrected as shown below:

Column 1, line 5, "Chipps" should read -- Chippis -- .

Signed and sealed this 31st day of October 1972.

(SEAL)
Attest:

EDWARD M. FLETCHER, JR.                 ROBERT GOTTSCHALK
Attesting Officer                       Commissioner of Patents